United States Patent
Wada et al.

[11] Patent Number: 5,966,590
[45] Date of Patent: Oct. 12, 1999

[54] METHOD FOR MANUFACTURING THERMAL-TYPE INFRARED SENSOR

[75] Inventors: Hideo Wada; Mitsuhiro Nagashima; Tokuhito Sasaki; Naoki Oda, all of Tokyo, Japan

[73] Assignees: Director General, Technical Research and Development Institute, Japan Defense Agency; NEC Corporation, both of Tokyo, Japan

[21] Appl. No.: 08/960,216

[22] Filed: Oct. 29, 1997

[30] Foreign Application Priority Data

Oct. 29, 1996 [JP] Japan .................................. 8-286681

[51] Int. Cl.$^6$ ................................................. H01L 31/08
[52] U.S. Cl. ......................... 438/54; 438/104; 338/15; 338/18
[58] Field of Search ................................. 438/54, 57, 66, 438/69, 85, 104; 338/15, 18, 25; 374/32

[56] References Cited

U.S. PATENT DOCUMENTS 4,574,263 3/1986 Liddiard .
5,450,053 9/1995 Wood .

FOREIGN PATENT DOCUMENTS

A-4-307977 10/1992 Japan .
A-8-105794 4/1996 Japan .
A-8-128889 5/1996 Japan .
A-8-242021 9/1996 Japan .

OTHER PUBLICATIONS

G.V. Jorgenson et al., "Doped Vanadium Oxide for Optical Switching Films", *Solar Energy Materials*, vol. 14, 1986, pp. 205–214.

Jin–Shown Shie et al., "Design considerations of metal–film bolometer with micromachined floating membrane", *Sensors and Actuators A*, vol. 33, 1992, pp. 183–189.

*Primary Examiner*—Charles Bowers
*Assistant Examiner*—Keith Christianson
*Attorney, Agent, or Firm*—Sughrue, Mion, Zinn, Macpeak & Seas, PLLC

[57] ABSTRACT

In a method of manufacturing a thermal-type infrared sensor including a thermosensitive part, a bolometer material is formed as the thermosensitive part and is subjected to post-processing to control a temperature coefficient of resistance in the bolometer material. The bolometer material may be formed by titanium or vanadium.

2 Claims, 5 Drawing Sheets

METHOD FOR MANUFACTURING THERMAL-TYPE INFRARED SENSOR

BACKGROUND OF THE INVENTION

1. Field of the Invention

The present invention relates to a method for producing a thermal-type infrared sensor, by using a metal film or a metal oxide film. Herein, it is to be noted throughout the instant specification that such a thermal-type sensor may be called a metal-film bolometer.

2. Description of the Related Art

As a bolometer material for thermal-type infrared sensors, it has been known to use a film of metals such as platinum and a film of metal oxides such as vanadium oxide.

For example, a bolometer-type infrared array sensor is proposed by Shie and Weng in Sensors and Actuators, A33 (1992) pp. 183, as shown in FIGS. 1A and 1B, and is produced by forming a space 13 within a Si substrate 10 operable as a heat sink, mounting beams 8 over the space 13, and arranging thermosensitive area 9 (in a suspending manner) around the beams 8. In the structure, the thermosensitive area 9 is arranged at a part thermally separated from the Si substrate. Herein, the thermosensitive area 9 is formed from a bolometer material, and additionally comprises a platinum electrode 11 operable also as a bias electrode and a NiCr infrared absorption film 12.

When vanadium oxide is used as the bolometer material in such a bolometer-type infrared sensor, the resistivity of vanadium oxide should inevitably be controlled. More specifically, because a great number of crystalline phases of the oxides of vanadium are present in the region of 4 to 5 atomic valences of vanadium, the resistivity of the bolometer material varies, depending on each crystalline phase. In order to control the resistivity thereof, proposal has been made by Jorgenson and Lee, Solar Energy Materials, 14(1986), p.205, about doping elements of metal impurities such as Nb, Ta, W, and Mo.

Among bolometer materials, platinum is advantageous in that platinum is hardly oxidized. However, platinum is poor in workability and, as a result, it rarely used in a silicon integrated circuit process. Therefore, recent interest has been directed to a metal material in place of platinum.

Instead of platinum, A. Tanaka et al have tried to use, as a bolometer material, Ti which has a small thermal conductivity and which is very often used in the Si—IC production process. However, it has been found out that Ti is chemically active and is easily oxidized within a process carried out after deposition of Ti and within a process of forming a protection film. This brings about a reduction of the temperature coefficient of resistance which serves as a significant factor of the bolometer material. As a result, a reduction of sensitivity is inevitable when Ti is used.

Herein, an amount of doped impurities in metal oxide films can not be controlled when the metal oxide films are formed by a film formation process, such as sol-gel process, a sputtering process, a chemical deposition process and the like. Therefore, the resistivity cannot be controlled satisfactorily by the above-mentioned processes. Additionally, a temperature coefficient of resistance becomes small with the increase of the doped amount.

SUMMARY OF THE INVENTION

It is an object of the present invention to provide a method which produces a thermal-type infrared sensor by using a bolometer material and which can solve the above-mentioned problems which might occur when the bolometer material is used as thermal-type infrared sensors.

As to the reduction of the temperature coefficient of resistance caused to occur when Ti is used as the bolometer material, the inventors have found out that such a reduced temperature coefficient of resistance can be recovered approximately at the initial level, by carrying out a reduction process after the formation of thermosensitive parts. Additionally, the inventors have further found out that while the temperature coefficient of resistance can be retained by using the conventional metal oxide materials, such as vanadium oxide, the resistivity can linearly be controlled by the method.

More specifically, the method for producing a thermal-type infrared sensor in accordance with the present invention comprises a step of forming a thermosensitive part which is formed by a bolometer material of at least a metal or a metal oxide produced by a method similar to that of a conventional method and an infrared absorption film and a step of subjecting then the thermosensitive part to a heating process in a reduction atmosphere containing hydrogen gas. The reduction atmosphere can be prepared by introducing a reduction gas formed by a gaseous mixture of argon and hydrogen gas in a vessel in vacuum after air discharge or by placing a wafer with a film formed thereon in a diffusion furnace at an ambient pressure and purging a given amount of a reduction gas comprising hydrogen gas into the furnace.

The heating process of Ti is carried out at a temperature between 350 and 400° C., within a hydrogen gas for such a short period. In this event, the temperature coefficient of resistance can be reached to 0.2%/°C. or more which is an available value.

Additionally, vanadium oxide may be subjected to a heat treatment at a temperature about 350 to 450° C., and is rendered into prepare a vanadium oxide film of a resistance value of 0.002 to 0.5 $\Omega$cm. The atmosphere for the heat treatment is satisfactorily reduction atmosphere, preferably containing hydrogen at about 2 to 20% for promoting the reaction with the bolometer material.

As the method for preparing a film from the bolometer material, an appropriate optimum method (sol-gel method, sputtering method, chemical deposition method, pulse-laser ablation method and the like) can be selected.

DESCRIPTION OF THE PREFERRED EMBODIMENTS

Description will be made about a method for producing a thermal-type infrared sensor according to the present invention in detail.

(First Embodiment)

Figure 1A:
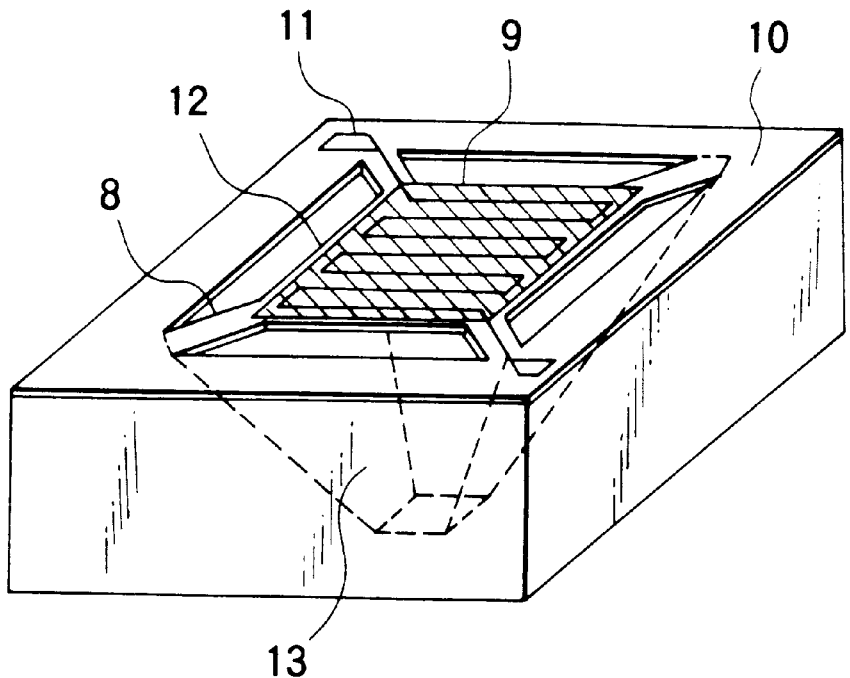
FIGS. 1A and 1B show views for use in describing the structure of the conventional bolometer-type infrared sensor.
Figure 1B:
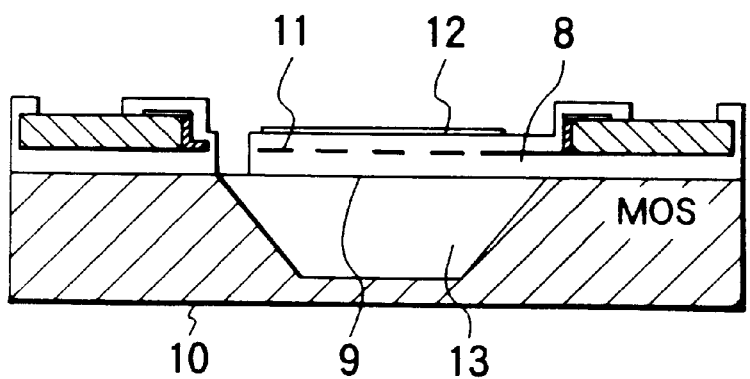

A thermal-type infrared sensor element according to a first embodiment of the present invention was at first manufactured and is similar in structure to that illustrated in FIGS. 1A and 1B except that a Ti film of a film thickness of 500 Angstroms was formed as a sensor material, namely bolometer material.

Herein, an infrared sensor may be formed either by a single sensor element or an array of sensor elements arranged one-dimensionally or two-dimensionally. At any rate, such an infrared sensor was formed in a sample wafer 1 (FIGS. 2A and 2B).

Figure 2A:
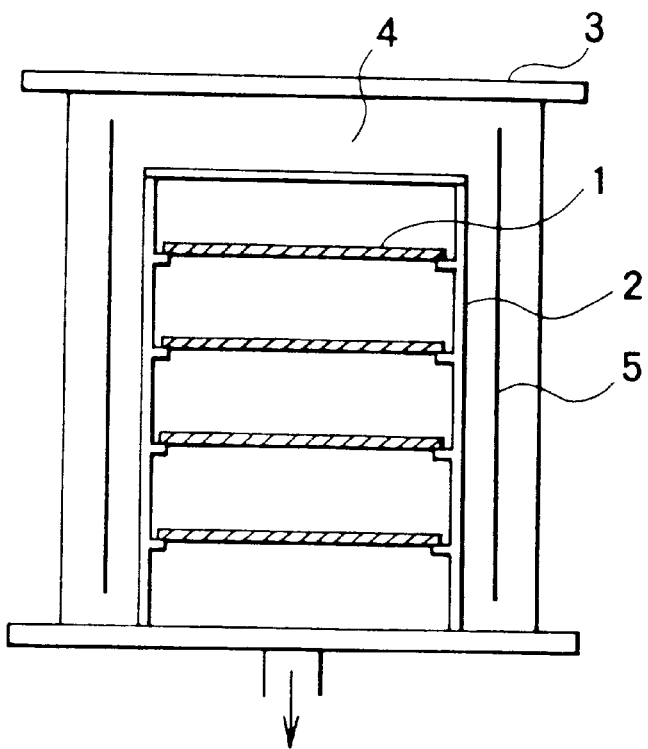
FIGS. 2A and 2B show views for use in describing a method according to an embodiment of the present invention.
Figure 2B:
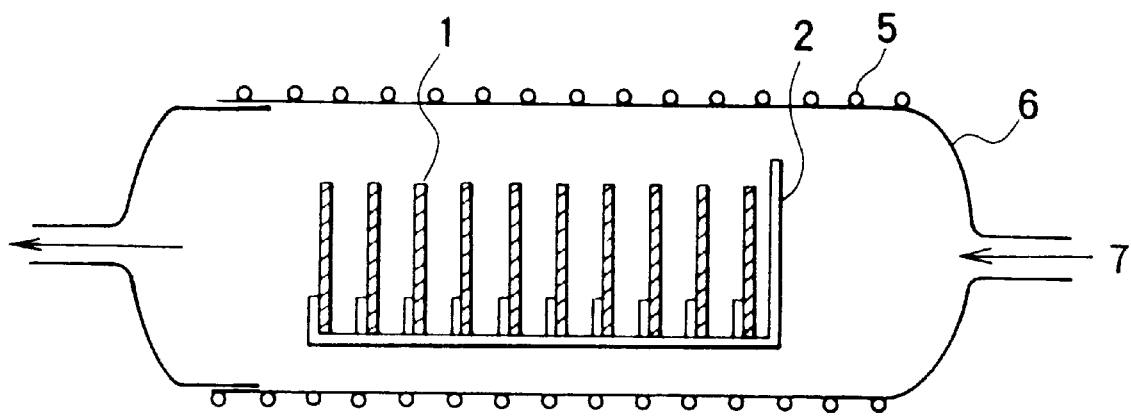

In FIG. 2A, a plurality of the wafers 1 were kept in a sample holder 2 and entered into a vacuum chamber. Under the circumstances, the vacuum chamber is evacuated to a pressure of $10^{-6}$ Torr or less. Then, a hydrogen gas was introduced into the vacuum chamber to 0.25 atm.

Thereafter, the wafers 1 were heated to a temperature of 400° C. for 24 hours by a heater 5 located within the vacuum chamber. Thus, the wafers 1 were subjected to a reduction process during this heat treatment. It has been confirmed that, while the Ti film had a prior temperature coefficient of the resistance of 0.07%/°C. prior to the reduction process, the temperature coefficient was increased after the reduction process to 0.21%/°C. which is equal to three times of the prior temperature coefficient. Subsequently, the Ti film bolometer was located within a vacuum package together with the other elements to structure the infrared sensor. It has been found out that the thermal-type infrared sensor thus produced exhibited sensitivity of three times that of the conventional infrared sensor.

(Second Embodiment)

A plurality of wafers 1 each of which serves to form a thermal-type infrared sensor were mounted on a sample holder 2 as shown in FIG. 2B. The sample holder was then introduced into a quartz tube 6 which is operable as a diffusion furnace. Prior to introduction of the sample holder 2, the diffusion furnace was preliminarily elevated to a temperature of 400° C. by means of a heater 5 and caused a hydrogen gas to flow at a flow rate of 7 at 12 liters per minute. As the sensor material, use was made of the same Ti film of 500 Angstroms like in the first embodiment. After the heat treatment was carried out for twenty-four hours, the temperature coefficient of the resistance of the Ti film was increased from 0.07%/°C. to 0.3%/°C. which is about four times of the prior temperature coefficient.

Subsequently, an infrared sensor was structured in a manner similar to that illustrated in the first emobidment. It has been confirmed that the infrared sensor thus manufactured had sensitivity of about four times in comparison with the conventional infrared sensor.

(Third Embodiment)

A vanadium oxide film was formed on a wafer 1 by dripping, onto the wafer 1, a sol solution containing vanadium. Thus, the vanadium oxide film was deposited on the wafer 1 by the sol-gel method and was thereafter subjected to a heat treatment in an atmosphere. As a result, the vanadium oxide film has a film thickness of 100 nm. As shown in FIG. 2A, a plurality of the wafers 1 were set in the sample holder 2 and were then introduced in the vacuum chamber 3. Under the circumstances, the vacuum chamber was evacuated to a pressure of $10^{-6}$ Torr or less and then a mixture gas of argon and hydrogen gas was introduced into the vacuum chamber 3. Thus, the vacuum chamber 3 was kept at a charged pressure in a hydrogen-containing atmosphere. The hydrogen concentration was held at about 5% in the vacuum chamber 3.

Figures 3A, 3B:
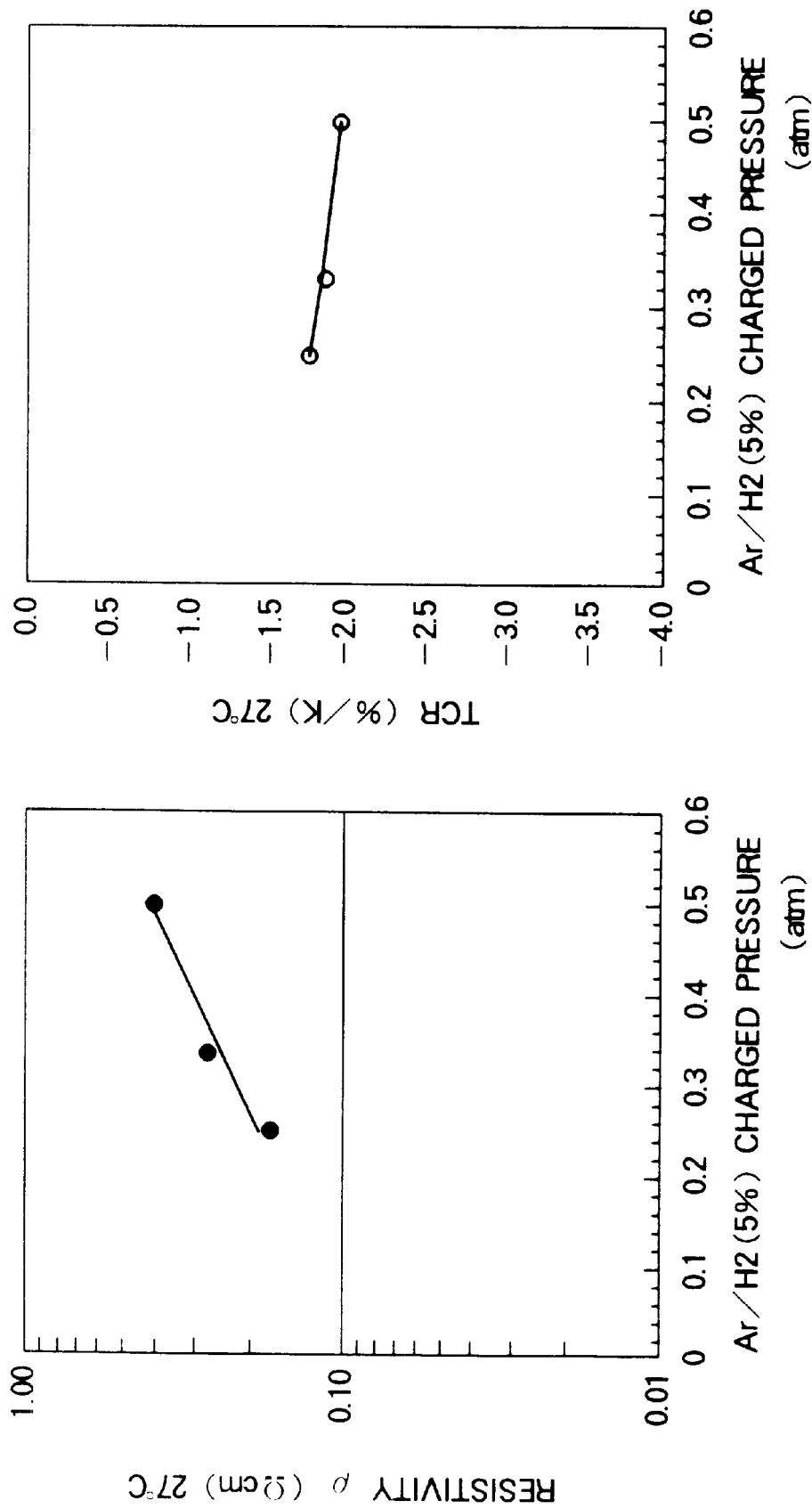
FIGS. 3A and 3B show views for use in describing a relationship between the resistivity of the vanadium oxide film or the temperature coefficient of resistance thereof and a gas pressure in a second embodiment of the present invention.

On introduction of the mixture gas, the charged pressures were changed within the range of 0.25 to 0.5 atm, as shown in FIG. 3A. Subsequently, heating treatments were conducted at a processing temperature of 400° C. for eight (8) hours under the changed charged pressures. Consequently, it has been found out that the resistivity was variable between 0.17 and 0.4 Ωcm in dependency upon the charged pressures.

On the other hand, the temperature coefficient of resistance was kept substantially constant within a range of −1.8 to −2.0%/K, even when the charged pressures were varied, as illustrated in FIG. 3B. A crystalline phase was specified by $VO_{2-a}$ because it included an oxygen less than $VO_2$ formed by tetra-valent vanadium. In this event, the crystalline phase was represented by the formula (1) and oriented in (001).

$$VO_{2-a} \qquad (1)$$

Figure 5:
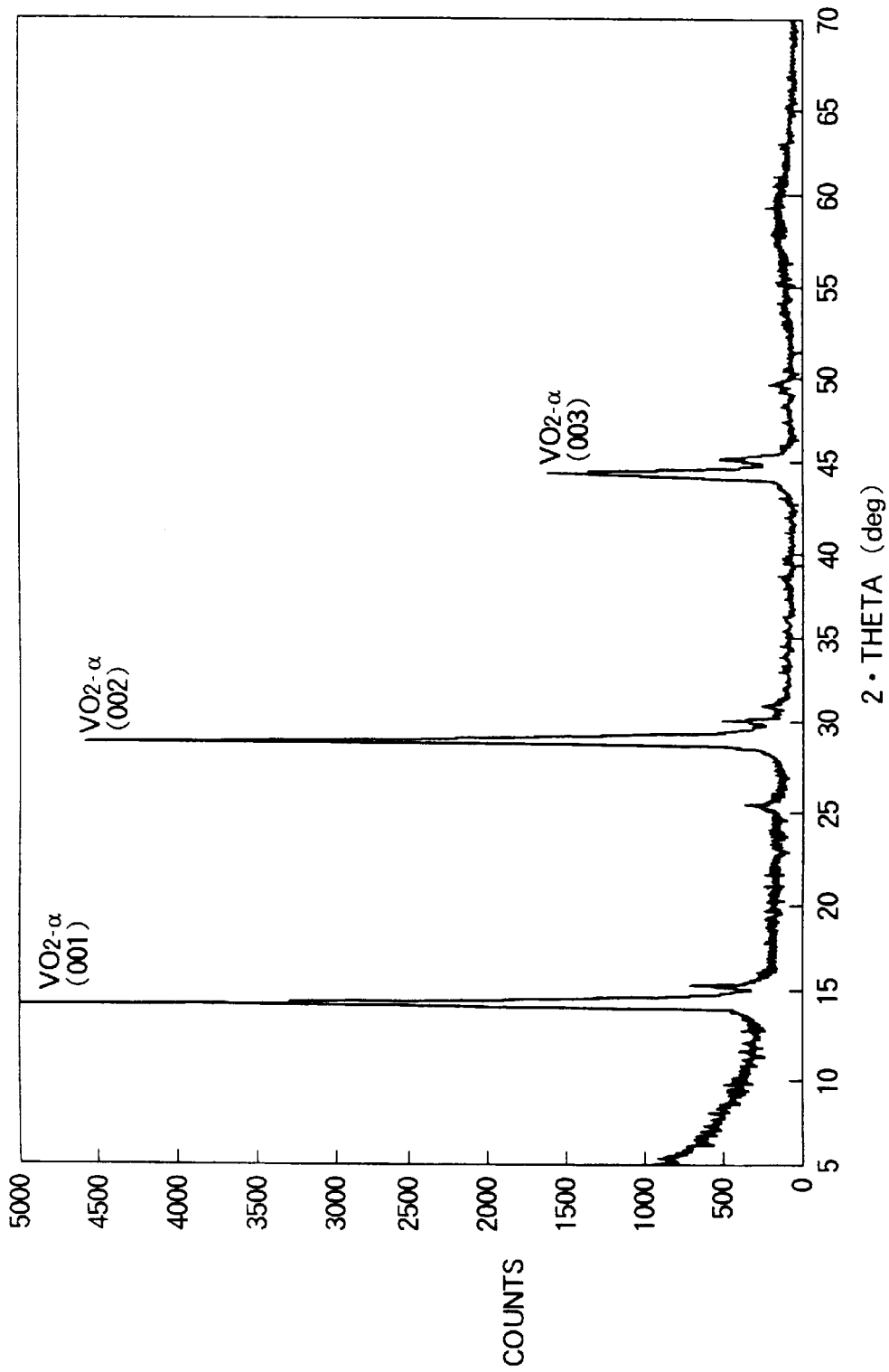
FIG. 5 is an X-ray diffraction chart of the vanadium oxide crystalline film produced by the method for production in accordance with the present invention.

FIG. 5 shows results of an X-ray diffraction analysis of the crystalline phase. The phase had a semiconductor-metal phase transition point as high as 100° C. or more, and therefore, the phase was extremely stable. As described above, the film resistivity could be controlled without any influence on the temperature coefficient of resistance.

(Fourth Embodiment)

Figure 4B:
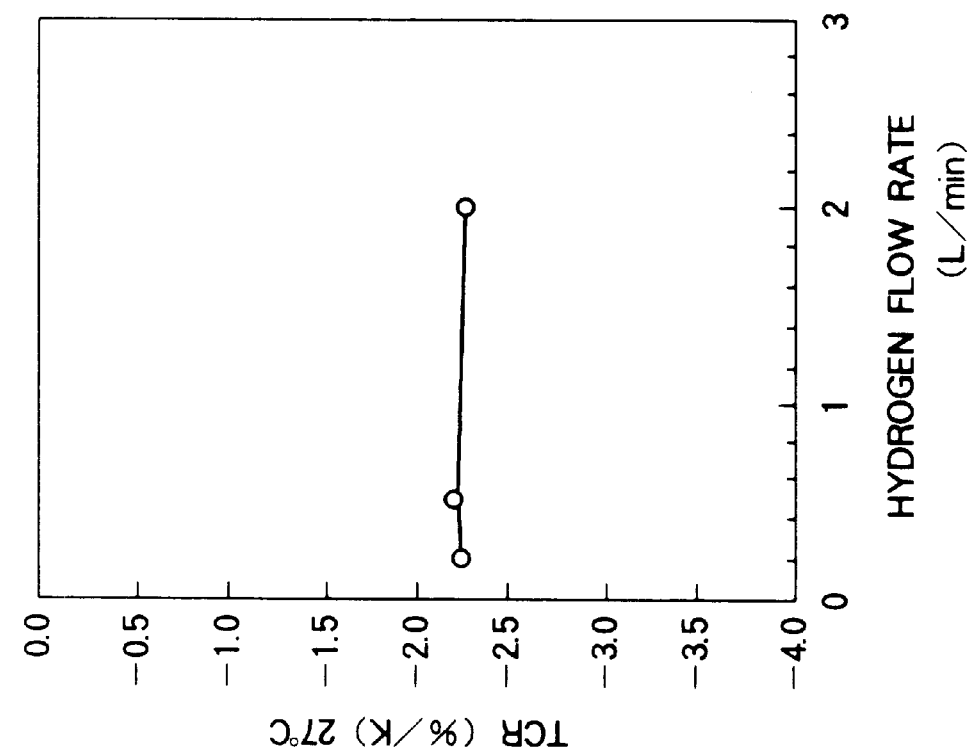
FIGS. 4A and 4B show views for use in describing a relationship between the resistivity of the vanadium oxide film or the temperature coefficient of resistance thereof and the flow of hydrogen gas in a fourth embodiment of the present invention.
Figure 4A:
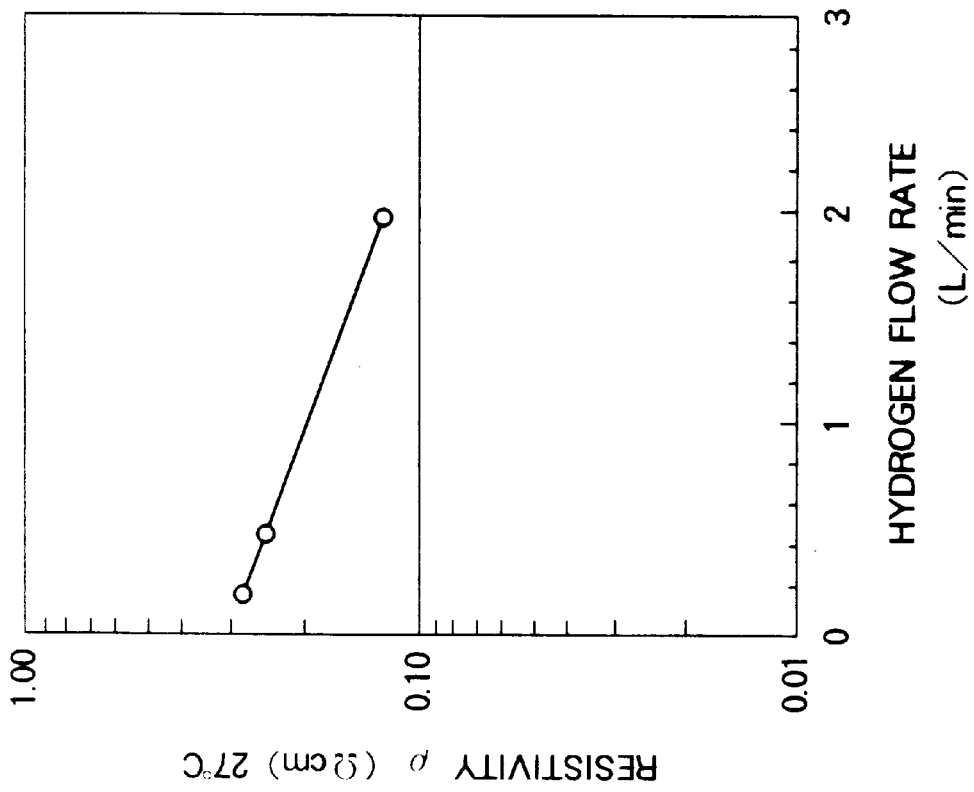

As shown in FIG. 2B, a plurality of the wafers 1 with vanadium oxide films as metal oxide films formed thereon were set in the sample holder 2 and were then introduced into the quartz tube 6 operable as a diffusion furnace. The diffusion furnace was preliminarily elevated to a temperature of 400° C. by means of the heater 5 with the hydrogen gas 7 caused to flow through the quartz tube 6 at a constant flow rate. It has been confirmed that it is possible to control a reduction rate by changing a flow rate of the hydrogen gas. As shown in FIG. 4A, when the flow rate of the hydrogen gas was changed from 0.2 to 2.0 liters per minute, the resistivity can be changed in the range of 0.12 to 0.3 Ωcm. As shown in FIG. 4B, the temperature coefficient of resistance could be kept substantially constant at −2.2%/K even when the flow rate was changed.

The crystalline phase of the film produced by the method of the present invention was composed of a crystalline phase specified by $VO_{2-a}$ because it included oxygen less than $VO_2$ formed by tetra-valent V as shown in FIG. 5, like in the third embodiment 3.

The phase was extremely stable and had the semiconductor-metal phase transition temperature which was as high as 100° C.

As mentioned above, the method according to the present invention can render the temperature coefficient of resistance of the metal or the metal oxide film into a desired value by carrying out a heat treatment in a reduction atmosphere containing hydrogen gas after completion of the thermal-type infrared sensor. Thus, the resulting bolometer-type infrared sensor can have an improved sensitivity by several times in comparison with the conventional sensor. In addition, the resisitivity of the film can be readily controlled when the film is formed by metal oxide.

What is claimed is:

1. A method for producing a thermal-type infrared sensor having a thermosensitive part formed by a bolometer material and an infrared absorption film, the bolometer material having a temperature coefficient of resistance and being formed from a material selected from the group consisting of titanium, titanium oxide, vanadium, and vanadium oxide including an oxygen content less than in $VO_2$, the method comprising the steps of:

forming said thermnosensitive part; and carrying out a heat treatment of said bolometer material in a reduction atmosphere containing a hydrogen gas to control the temperature coefficient.

2. A method for producing a thermal-type infrared sensor having a thermosensitive part formed by a bolometer material, the bolometer material having a temperature coefficient of resistance, the method comprising the steps of:

forming said thermosensitive part;

carrying out a heat treatment of said bolometer material within a chamber kept in a reduction atmosphere including, as a reduction gas, a mixture of argon and hydrogen gas, with the reduction gas being caused to flow into the chamber at a constant flow rate; and controlling a charged pressure in said chamber to thereby control the resistivity of the bolometer material with the temperature coefficient kept substantially unchanged.

* * * * *